US007426787B2

(12) United States Patent
Tracy et al.

(10) Patent No.: US 7,426,787 B2
(45) Date of Patent: Sep. 23, 2008

(54) RETRACTOR FOR CIRCULAR SAW LOWER SAFETY-GUARD

(75) Inventors: Jack R. Tracy, Camarillo, CA (US); Samuel Grimaldo, Newbury Park, CA (US); James M. Larkin, Oxnard, CA (US)

(73) Assignee: SJ2 Industries, LLC, Camarillo, CA (US)

( * ) Notice: Subject to any disclaimer, the term of this patent is extended or adjusted under 35 U.S.C. 154(b) by 0 days.

(21) Appl. No.: 11/424,507

(22) Filed: Jun. 15, 2006

(65) Prior Publication Data

US 2007/0022852 A1 Feb. 1, 2007

Related U.S. Application Data

(60) Provisional application No. 60/715,882, filed on Sep. 9, 2005.

(51) Int. Cl.
*B23D 45/16* (2006.01)
*B23D 47/00* (2006.01)

(52) U.S. Cl. .......................................... 30/391; 30/373

(58) Field of Classification Search ................ 30/166.3, 30/391, 373, 390; 93/397.1, 478; 125/13.01; 451/451-456

See application file for complete search history.

(56) References Cited

U.S. PATENT DOCUMENTS

| | | | | | |
|---|---|---|---|---|---|
| 1,102,018 | A | * | 6/1914 | Dodds | 30/373 |
| 1,655,916 | A | | 1/1928 | Neuberth | |
| 1,738,896 | A | * | 12/1929 | Hansen | 30/391 |
| 1,780,174 | A | | 11/1930 | Crowe | |
| 1,811,577 | A | | 6/1931 | Crowe | |
| 1,813,231 | A | | 7/1931 | Crowe | |
| 2,342,052 | A | | 2/1944 | Jimerson et al. | |
| 2,722,246 | A | | 11/1955 | Arnoldy | |
| 2,737,985 | A | | 3/1956 | Utz | |
| 2,790,468 | A | | 4/1957 | Wilhide | |
| 2,828,784 | A | | 4/1958 | Damijonaitis | |
| 2,963,056 | A | * | 12/1960 | Rickford | 83/391 |
| 3,063,481 | A | * | 11/1962 | Sutherland | 30/391 |
| 3,262,471 | A | * | 7/1966 | McCarty | 30/377 |
| 3,410,325 | A | | 11/1968 | Winther | |
| 3,441,067 | A | * | 4/1969 | Forcier | 30/391 |

(Continued)

OTHER PUBLICATIONS

PCT International Search Report and Written Opinion of the International Searchning Authority mailed Mar. 20, 2007 in corresponding application PCT/US06/35106.

*Primary Examiner*—Boyer D. Ashley
*Assistant Examiner*—Edward Landrum
(74) *Attorney, Agent, or Firm*—Joseph G. Swan, P.C.

(57) ABSTRACT

Provided is an apparatus for lifting a retractable lower safety-guard on a circular saw. In one representative implementation, an actuator is attached to the circular saw and an elongated arm is coupled to the actuator such that operating the actuator causes the elongated arm to lift. In addition, an engagement element is attached to the retractable lower safety-guard of the circular saw. When lifted, the elongated arm engages the engagement element, thereby retracting the retractable lower safety-guard of the circular saw. Preferably, the actuator is configured, and is located sufficiently close to a power switch for the circular saw, so that the actuator can be operated simultaneously with the power switch using a single hand. Also provided are retrofitting techniques for attaching such a device to an existing circular saw.

17 Claims, 3 Drawing Sheets

U.S. PATENT DOCUMENTS

| | | | | | |
|---|---|---|---|---|---|
| 3,491,808 | A | | 1/1970 | Grieb | |
| 3,613,748 | A | | 10/1971 | De Pue | |
| 3,706,332 | A | | 12/1972 | George | |
| 3,730,239 | A | | 5/1973 | Kaman et al. | |
| 3,787,973 | A | * | 1/1974 | Beisch et al. | 30/391 |
| 3,805,639 | A | | 4/1974 | Peter | |
| 3,880,032 | A | | 4/1975 | Green | |
| 4,672,746 | A | | 6/1987 | Zeilenga | |
| 4,685,214 | A | * | 8/1987 | Shearon et al. | 30/391 |
| 4,693,008 | A | | 9/1987 | Velie | |
| 4,811,488 | A | | 3/1989 | Press | |
| 4,892,022 | A | | 1/1990 | Cotton et al. | |
| 5,075,976 | A | * | 12/1991 | Young | 30/391 |
| 5,370,025 | A | | 12/1994 | Itzov | |
| 5,531,147 | A | | 7/1996 | Serban | |
| 5,638,731 | A | * | 6/1997 | Garuglieri | 83/397 |
| 5,699,705 | A | | 12/1997 | Sibbet | |
| 5,778,747 | A | | 7/1998 | Chen | |
| 5,832,614 | A | | 11/1998 | Gallagher | |
| 5,850,697 | A | | 12/1998 | Welch | |
| 6,014,813 | A | | 1/2000 | Merino | |
| 2005/0252012 | A1 | * | 11/2005 | Johnson, III | 30/391 |

* cited by examiner

FIG. 2
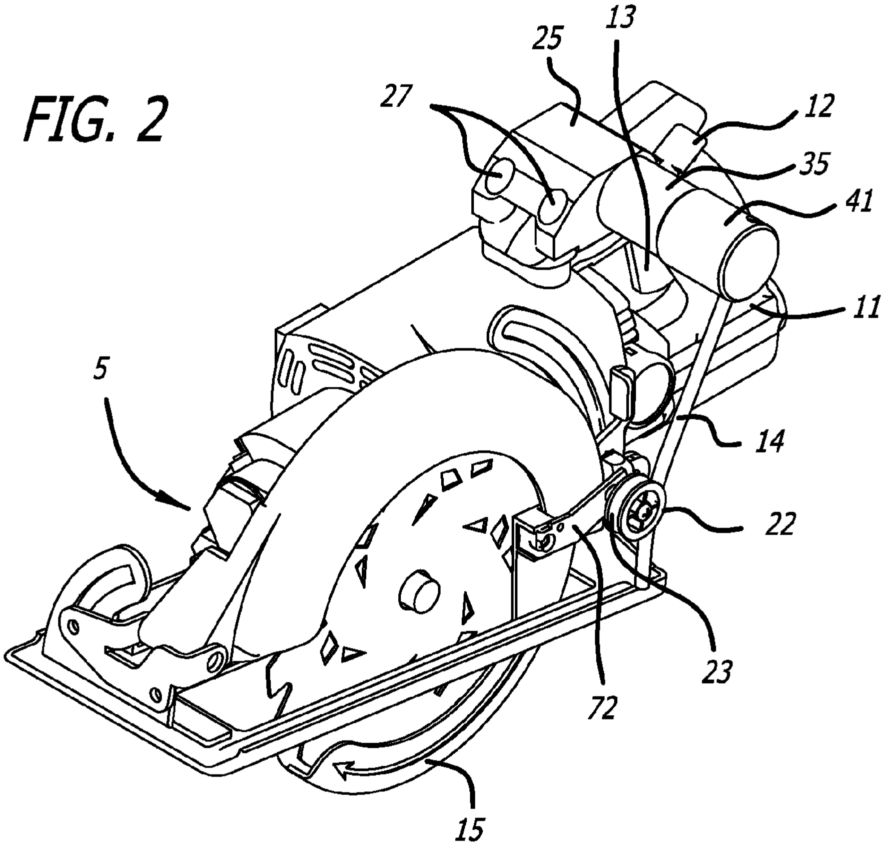
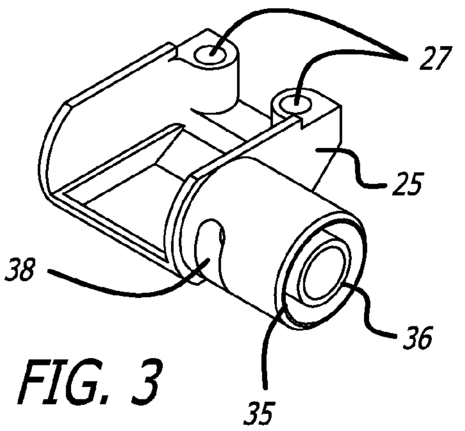
FIG. 3
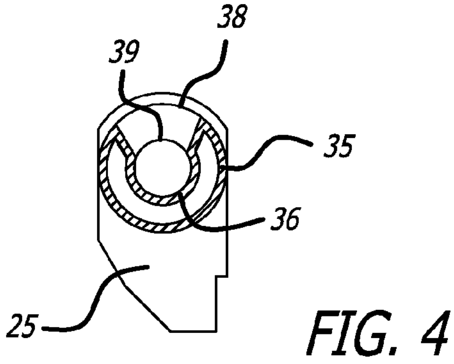
FIG. 4

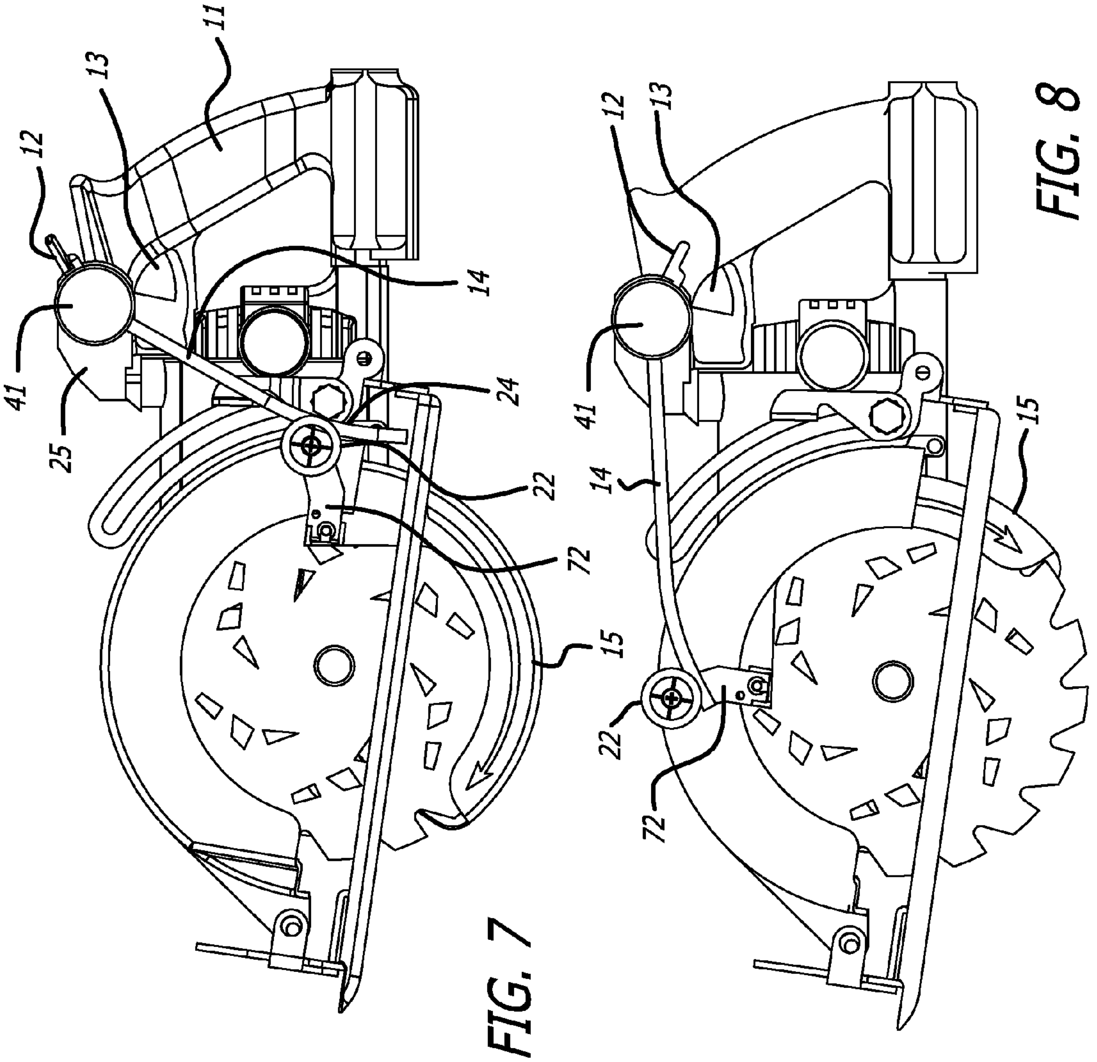
FIG. 7
FIG. 8
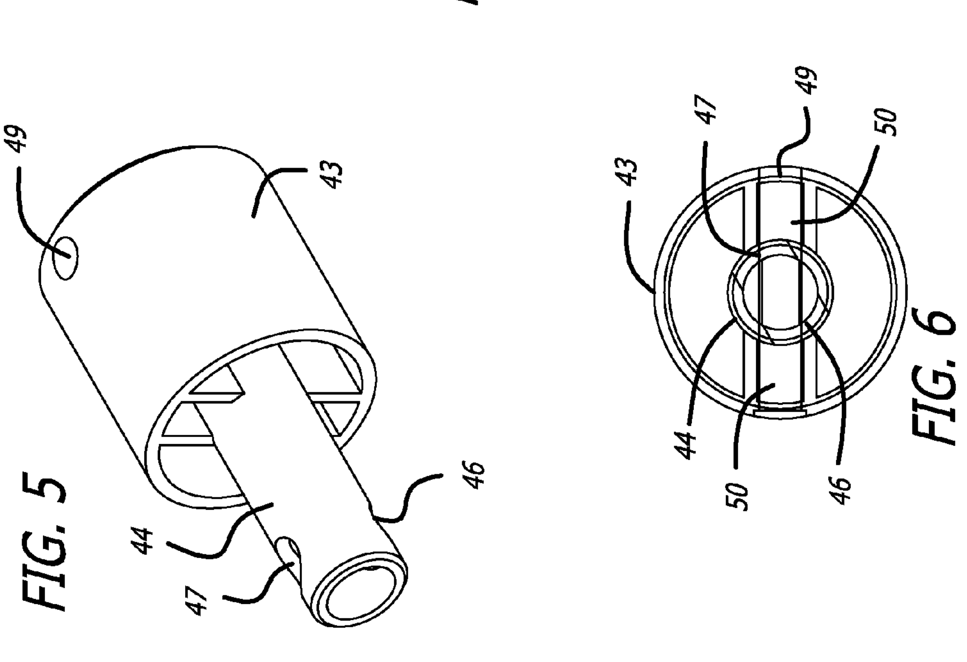
FIG. 5
FIG. 6

RETRACTOR FOR CIRCULAR SAW LOWER SAFETY-GUARD

Priority is claimed to U.S. Provisional Patent Application Ser. No. 60/715,882, filed on Sep. 9, 2005, and titled "Power Safety Guard", which application is incorporated by reference herein as though set forth herein in full.

FIELD OF THE INVENTION

The present invention pertains to circular power saws and, more particularly, to devices for lifting the retractable lower safety-guard on a circular saw and to retrofitting techniques for attaching such devices to existing circular saws.

BACKGROUND

The lower safety-guard on most or all hand-held circular power saws is a necessity in order to protect the operator. It is unfortunate, but a reality is that in the construction business, and in home usage, in some instances the lower safety-guard is a liability and a hindrance for the operator.

To lift the lower safety-guard, the operator must first lay the saw on the material to cut, lift the guard with the left hand until the blade is in a "free-cutting position, and then pull the trigger (using the right hand) to begin cutting the material. As a result of this procedure, the line that the operator desires to cut cannot always be seen, and because the operator must use his or her left hand to lift the lower safety-guard, the operator is unable to either hold the material being cut (e.g., when trimming the end of a 2'×4' piece of wood) or to push the saw forward with his or her left hand. This limits the precision performance of the saw, in terms of the accuracy of cutting as well as in the ease of cutting. It also hinders the productive output of the operator.

Often, operators, both commercial and home users, will either "pin" the lower safety-guard in the "up" position, use a small piece of wood to shim the lower safety-guard in the "up" position, or even remove the lower safety-guard entirely. This is a major safety infraction, as the lower safety-guard is made inoperable and ineffective as a result of such pinning or shimming. If the saw should be placed on the ground and the blade has not come to a complete stop, this unsafe procedure could allow the saw to run across the operator's foot. Moreover, as happens frequently, when the saw blade binds while cutting, the saw will "kick back" towards the operator, placing the operator in a position in which he or she is exposed to being cut by the turning blade.

O.S.H.A. presently imposes a fine on commercial users who have "pinned" or shimmed their lower safety-guards up, have removed their lower safety-guards, or in any way have altered the saw in a manner such that the lower safety-guard cannot return to the "closed" position (i.e., covering the blade). However, even with the threat of such fines, operators continue to take measures to avoid having the lower safety-guard return to the proper, or down, position.

SUMMARY OF THE INVENTION

The present invention addresses this problem by providing an apparatus for lifting a retractable lower safety-guard on a circular saw. In one representative implementation, an actuator is attached to the circular saw and an elongated arm is coupled to the actuator such that operating the actuator causes the elongated arm to lift. In addition, an engagement element is attached to the retractable lower safety-guard of the circular saw. When lifted, the elongated arm engages the engagement element, thereby retracting the retractable lower safety-guard of the circular saw. In addition, in the preferred embodiments when the thumb is removed from the thumb lever of the present invention, the lower safety-guard automatically will retract to its closed position by virtue of the fact that the lower safety-guard is spring-loaded, as provided with the circular saw. Preferably, the actuator is located sufficiently close to a power switch for the circular saw and is configured such that the actuator can be operated simultaneously with the power switch using a single hand. Also provided are retrofitting techniques for attaching any of such devices to an existing circular saw, e.g., by simply removing two screws, attaching a first upper assembly with replacement screws and attaching an engagement element to the lower safety-guard.

The foregoing summary is intended merely to provide a brief description of the general nature of the invention. A more complete understanding of the invention can be obtained by referring to the claims and the following detailed description of the preferred embodiments in connection with the accompanying figures.

BRIEF DESCRIPTION OF THE DRAWINGS

FIG. 2 is a perspective view of a safety-guard lifting device as attached to a circular saw in accordance with a representative embodiment of the present invention.

FIG. 3 is a bottom perspective view of the base portion of an upper assembly according to a representative embodiment of the present invention.

FIG. 4 is a vertical cross-sectional view of the base portion of an upper assembly according to a representative embodiment of the present invention.

FIG. 5 is a bottom perspective view of a pivoting assembly according to a representative embodiment of the present invention.

FIG. 6 is a vertical cross-sectional view of a pivoting assembly according to a representative embodiment of the present invention.

FIG. 7 is a left side elevational view of a circular saw with a safety-guard lifting device attached and with the lower safety-guard in a slightly raised position, according to a representative embodiment of the present invention.

FIG. 8 is a left side elevational view of a circular saw with a safety-guard lifting device attached and with the lower safety-guard in the fully raised position, according to a representative embodiment of the present invention.

DESCRIPTION OF THE PREFERRED EMBODIMENT(S)

Figure 1:
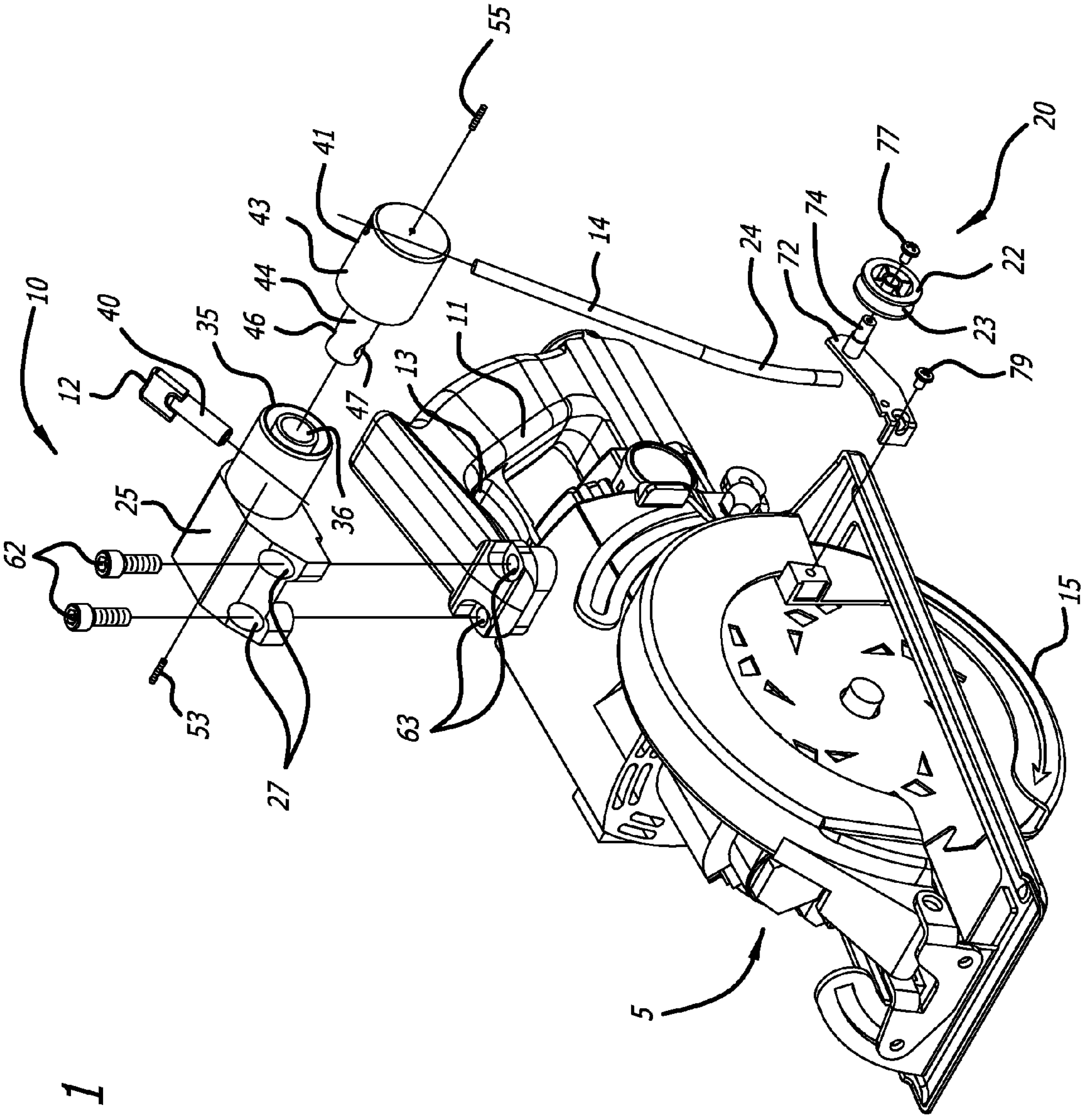
FIG. 1 is an exploded view showing the construction of a safety-guard lifting device and the attachment of such a device to a circular saw in accordance with a representative embodiment of the present invention.

As shown in FIGS. 1 and 2, a device according to the preferred embodiments of the invention includes an upper assembly 10, which preferably is attached to a portion of the circular saw 5 other than the movable lower safety-guard 15 and, more preferably, is attached to a handle portion 11 of the circular saw 5. In this regard, the handle portion 11 refers to any area within the vicinity of the handle of the circular saw 5.

Upper assembly 10 has a tab 12, which functions as an actuator and is located close enough to the saw's power trigger 13 so that tab 12 can be depressed with the user's thumb while the power switch 13 is operated with the user's index finger (of the same hand). Upon depressing actuator 12, an elongated arm 14 rotates upwardly, pushing the saw's lower safety-guard 15 into the "up" position (i.e., the operative position for circular saw 5). To facilitate this lifting action, a small assembly 20 that includes a roller 22 preferably is attached to the saw's movable lower safety-guard 15. More preferably, roller 22 has internal bearings (not shown) to facilitate rotation and a central groove 23 along its perimeter for securely accommodating elongated arm 14. The following provides a more detailed description regarding the construction and attachment of upper assembly 10 and lower assembly 20.

As shown in FIG. 1, upper assembly 10 includes a base portion 25, which is provided with mounting holes 27 and an extension portion, which extension comprises an outer cylindrical portion 35 and an inner cylindrical portion 36. As shown in FIGS. 3 and 4, the outer cylindrical portion 35 has a slot 38 cut out along a length of its circumference, and inner cylindrical portion 36 has a matching slot 39 cut out along the same arc, with both of slots 38 and 39 being just wide enough to loosely accommodate the stem portion 40 (e.g., as shown in FIG. 1) of tab 12.

Pivoting assembly 41, shown in closer detail in FIG. 5, is comprised of an outer cylinder 43, from which a narrower hollow cylinder 44 protrudes. More specifically, protruding cylinder 44 has an outer diameter that is just slightly smaller than the inner diameter of inner cylindrical portion 36 of base portion 25. Protruding cylinder 44 also has matching holes 46 and 47 (e.g., as shown in FIGS. 1 and 5) on opposite sides of its circumference, which are just slightly larger than the other diameter of the stem portion 40 of tab 12 (e.g., as shown in FIG. 1). Outer cylinder 43 (e.g., as shown in FIGS. 1 and 5), in turn, has a hole 49 and matching cylindrical passage 50, which are just slightly larger than the outer diameter of elongated arm 14 (e.g., as shown in FIGS. 1, 5 and 7), with passage 50 extending through the center of outer cylinder 43 and terminating at the opposite wall of outer cylinder 43. As shown in FIG. 6, passage 50 is oriented at an angle with respect to a line passing through the centers of holes 46 and 47.

Thus, referring primarily to FIG. 1, in the present embodiment upper assembly 10 is constructed as follows. First, pivoting assembly 41 is attached to base portion 25 by inserting protruding cylinder 44 into inner cylinder 36 and aligning hole 46 with slots 38 and 39. Then, tab 12 is inserted through slot 38, hole 46, slot 39 and hole 47, in order, and then is secured in place using a setscrew 53. Finally, elongated arm 14 is inserted into hole 49 and passage 50, as far as it can be until contacting the opposite wall of outer cylinder 43, and then is secured in place using a setscrew 55.

Once upper assembly 10 has been constructed in the foregoing manner, it is mounted to the handle portion 60 of circular saw 5 by inserting mounting screws 62 through mounting holes 27 and then screwing them into threaded holes 63 in the handle portion 11 of circular saw 5. Additional discussion regarding the attachment of upper assembly 10 to circular saw 5 is provided below.

Lower assembly 20 (e.g., as shown in FIG. 1) includes an attachment bracket 72, having an outwardly extending shaft 74, and a roller 22, which is shaped as a wheel in the present embodiment. To assemble lower assembly 20, it is only necessary to slide roller 22 as far as it will go onto shaft 74 (i.e., until the wider portion of shaft 74 is encountered) and then secure it on with screw 77. The narrower portion of shaft 74 is long enough to loosely accommodate roller 22, with screw 77 simply acting as an end stop. As a result, when installed roller 22 rotates freely on shaft 74. The entire assembly 20 is then attached to lower safety-guard 15 using mounting screw 79. Additional discussion regarding the attachment of lower assembly 20 to lower safety-guard 15 is provided below.

FIGS. 7 and 8 illustrate the operation of the device described above. More specifically, FIG. 7 shows the device with tab 12 depressed to the point that elongated arm 14 has engaged roller 22 (more specifically, the groove 23 in roller 22) and partially moved roller 22 and, correspondingly, lower safety-guard 15. Because of the way that protruding cylinder 44 is inserted into inner cylinder 36, the entire pivoting assembly 41 is free to rotate relative to base portion 25. In addition, because tab 12 is inserted through holes 46 and 47 and fixed to protruding cylinder 44 with set screw 53, clockwise rotation (according to the views of FIGS. 7 and 8) of tab 12 (meaning downward depression of tab 12) causes clockwise rotation of pivoting assembly 41, thereby resulting in clockwise rotation of elongated arm 14. Such rotation/depression of tab 12 is possible due to the provision of slots 38 and 39.

Thus, after partially retracting lower safety-guard 15, as shown in FIG. 7, additional depression of tab 12 causes elongated arm 14 to rotate further upwardly, exerting upward force on roller 22. Because lower assembly 20 is fixedly attached to lower safety-guard 15, such upward force causes lower safety-guard 15 to be raised. With tab 12 fully depressed, lower safety-guard 15 is fully retracted into the up position, as shown in FIG. 8.

It is noted that roller 22 may be replaced with any other type of engagement element, e.g., a non-rotating one. However, the fact that roller 22 rotates helps to provide a smoother lifting mechanism. Also, it is noted that elongated arm 14 includes a downward bend 24 along the segment at which it contacts roller 22. This provides a cam-like structure, ensuring the surface of elongated arm 14 that contacts roller 22 is correctly positioned to provide the increased lifting force along the entire retracting motion. This same result could be achieved in other ways, e.g., by replacing roller 22 with a cam whose shape is appropriately designed to achieve the same effect.

It is contemplated that tab 12 may be replaced by other types of buttons, levers or other actuators, e.g., that are activated in other ways. For example, by providing the appropriate mechanical linkages or by using an electrical switch and power assist, tab 12 can be replaced with a second trigger (i.e., in addition to the power trigger 13 for the circular saw 15), which second trigger preferably would be operated by one of the user's other fingers. In any event, in the preferred embodiments the actuator is configured and located such that an individual, using only a single hand, can simultaneously operate both the actuator 12 and a power switch 13 for the circular saw 5.

In the embodiment discussed above, the retracting device is entirely mechanical. However, in alternate embodiments, tab 12 is implemented as an electrical switch and a power assist is used to rotate arm 14 when tab 12 is depressed.

In either such embodiment, tab 12 can be spring-biased into the position corresponding to the inoperative state of the lower safety-guard 15 (i.e., spring-biased up, in the illustrated embodiment). For example, a simple coil spring can be attached between base portion 25 and pivoting assembly 41 to achieve this effect. In any event, as a result of such spring biasing, any release of pressure on tab 12 will cause the lower safety-guard 15 to rotate back into the inoperative position. However, as the lower safety-guard 15 itself typically is spring-biased toward the closed position, it generally is not necessary to incorporate any such spring biasing into a safety-guard retracting device according to the present invention. On the other hand, as noted above, such separate spring-biasing can mean that the arm 14 always is in contact with the engagement element 22.

In a still further embodiment, the saw's power trigger 13 itself (e.g., implemented as a single-pole double-throw switch) is used to actuate the power assist that lifts the lower safety-guard 15. In such an embodiment, for example, the initial closing of the electrical contacts for the saw's trigger would activate the power assist, e.g., thereby raising the arm 14 and lifting the lower safety-guard 15.

Moreover, in certain embodiments power to the power assist is shut off after a specified amount of time (e.g., a few seconds) or after a switch detects that the lower safety-guard 15 has been fully retracted. In such embodiments, the lower safety-guard 15 would not be artificially maintained in a retracted position after a very limited period of time. As a result, after the initial retracting, the lower safety-guard 15 would be allowed to return to the position in which the saw blade is covered in the same manner as a conventional lower safety-guard.

It should be noted that elongated arm 14 may consist of a single rigid member or may consist of multiple rigid members linked together. Also, in other embodiments of the invention the elongated arm 14 is replaced with other lifting mechanisms. For example, in one alternate embodiment, a wire or string is used as the lifting mechanism and is secured to an engagement member 22 (e.g., other than a roller) which may be, e.g., a pivotal screw.

By utilizing a retracting device according to the present invention, the chance of an operator being harmed is significantly reduced, e.g., in the event of a "kick-back" which occurs when a saw binds, or when an operator sets a saw down when the blade has not completely stopped turning. The lower safety-guard 15 will be in its original safe, closed position, and the need for pinning or shimming the lower safety-guard 15 is eliminated. Accordingly, such a device can provide a safer environment for the operator when using a hand-held circular saw 5.

In a representative embodiment of the present invention, the device is provided as two fully assembled components, an upper assembly 10 and a lower assembly 20, and is attachable to an existing circular saw 5. A technique for attaching such a device to an existing circular saw 5 (i.e., a retrofitting attachment technique) is now described.

Initially, one or more handle screws are removed from the handle portion 11 of the circular saw 5. As used herein, a "handle screw" is simply intended to mean a screw located near the handle portion 11 of the circular saw 5. Typically, there will be two handle screws near the top of the saw's handle that attach the handle to the rest of the circular saw 5. These two screws are removed and replaced with replacement mounting screws 62. It is noted that although replacement screws 62 may be the original handle screws that were used in the circular saw 5, typically, it will be necessary or preferable to use different, longer screws for mounting screws 62. In any event, the mounting screws 62 are inserted through mounting holes 27 and then into threaded holes 63 that are exposed by removing the original screws, in the manner already discussed above.

Thus, often all that is necessary to attach upper portion 10 is to remove and replace two screws. For this type of installation, the mounting holes 27 are located and configured on upper assembly 10 so as to match the handle screws on the circular saw 5. In many existing models of circular saws 5 (e.g., Skil™ and Bosch™), these handle screws are located on the top of the saw's handle, as illustrated in the drawings.

Next, a safety-guard screw (which may be any existing screw in lower safety-guard 15, but generally is the one used to attach a thumb tab for manually retracting the lower safety-guard 15) is removed from the saw's lower safety-guard 15. A replacement screw 79 (which often will be the same screw that was just removed) is then used to secure lower assembly 20 to lower safety-guard 15, e.g., in the manner described above. The thumb tab that was just removed generally is then discarded. Thus, often all that is necessary to attach lower assembly 20 to lower safety-guard 15 is to remove and replace a single safety-guard screw.

Following these two simple steps, the device is fully installed and ready for operation. As is apparent above, a device according to the present invention can be easily retrofitted on to an existing circular saw.

In the embodiment described above, elongated arm 14 is attached using setscrew 55 and tab 12 is attached using setscrew 53. However, in the preferred embodiments of the invention, either or both of such setscrews are eliminated. More preferably, elongated arm 14 is molded together with outer cylinder 43 (eliminating the need for setscrew 55) and tab 12 is wedged into either or both of hole 46 and/or hole 47 (creating a tight interference fit and eliminating the need for setscrew 53).

In an alternative embodiment, a device according to the present invention may be manufactured as part of the circular saw. In either event (whether manufactured separately for later attachment or manufactured as part of the circular saw), it generally is only necessary to have two components, one in which the engagement element is attached to the lower safety-guard 15 and another in which the actuator is attached to a different part of the saw 5 (i.e., other than the lower safety-guard 15). As used herein, the word "attached" is intended to mean either separately mounted to (e.g., using screws, rivets, glue or any other way of attaching) or integrally formed with.

A device according to the present invention preferably will add only approximately 5 ounces of weight to the saw 5. As should be apparent from the discussion above, it generally can be installed in less than five minutes, often only requiring the removal and replacement of one small screw (to attach lower assembly 20) and two large screws (to attach upper assembly 10) which generally will already be included with the saw, as manufactured. It need not be a permanent fixture of the saw, it generally will not hinder usage of the saw, and it generally will provide no encumbrance in the operation or storage of the saw.

The present invention thus provides a solution for the safety problem described above, in which operators pin, shim or otherwise disable the lower safety-guard on a circular saw in order to free up one of the operator's hands (usually the left one) for holding the material being cut and to provide a clearer view of the cutting line. As a result, a device of the present invention often can allow the operator to maintain a high level of accurate cutting and output. In one of the representative embodiments discussed above, the device of the present invention is a simple addition to a hand-held circular saw, allowing operators to use the left hand to hold the material (for trimming) or to place their left hand on the upper handle for guiding the saw, while at the same time, using the same hand that is operating the trigger (which activates the saw blade) to lift the lower safety-guard into a position to begin cutting.

Neither hands nor fingers are near the blade. Also, in the case of home users, one does not need to reach over the top of the saw to lift the lower safety-guard to begin cutting, thus eliminating further exposure to accidents.

Moreover, a device of the present invention can be configured so as to lift the lower safety-guard 15 and then subsequently return the lower safety-guard to the fully closed position after each cut is completed, when the saw is dropped or set on the ground, or if the saw binds. A device according to the preferred embodiments does not circumvent the lower safety-guard's application or alter its intended function in any way. In addition, because such devices allow both hands to be used for the actual cutting application, the issue of reduced effectiveness of the operator is eliminated.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. An apparatus for lifting a retractable lower safety-guard on a circular saw, comprising:

an actuator attached to the circular saw;

an elongated arm coupled to the actuator such that operating the actuator causes the elongated arm to lift, with additional operation of the actuator causing further lifting of the elongated arm; and an engagement element attached to the retractable lower safety-guard of the circular saw;

wherein, when lifted, the elongated arm engages the engagement element, thereby retracting the retractable lower safety-guard of the circular saw, wherein the actuator is configured and located such that, using a single hand, the actuator and a power switch for the circular saw can be operated simultaneously, and wherein the elongated arm contacts the engagement element only after the actuator has caused the elongated arm to lift a sufficient distance.

2. An apparatus according to claim 1, wherein when the power switch for the circular saw is operated with a user's index finger the actuator can be operated with the user's thumb.

3. An apparatus according to claim 1, wherein the elongated arm is rigid along its entire length.

4. An apparatus according to claim 3, wherein depressing the actuator causes the elongated arm to lift, thereby retracting the retractable lower safety-guard of the circular saw.

5. An apparatus according to claim 1, wherein the engagement element rotates.

6. An apparatus according to claim 5, wherein the engagement element is provided with a groove for securely accommodating the elongated arm.

7. An apparatus according to claim 1, wherein the actuator is directly attached to the elongated arm such that rotating the actuator causes the elongated arm to rotate in the same direction.

8. An apparatus according to claim 1, wherein the actuator and the elongated arm are part of a first assembly and the engagement element is part of a second assembly, and wherein the apparatus consists only of the first assembly and the second assembly.

9. An apparatus according to claim 8, wherein the first assembly detachably attaches to a handle portion of the circular saw, and the second assembly detachably attaches to the retractable lower safety-guard.

10. An apparatus according to claim 1, wherein the elongated arm bends along a segment at which it engages the engagement element.

11. An apparatus according to claim 1, wherein the coupling between the actuator and the elongated arm is a non-power-assisted mechanical coupling.

12. An apparatus according to claim 1, wherein the engagement element is attached to an outer edge of the retractable lower safety-guard, close to an edge of a blade of the circular saw.

13. An apparatus according to claim 1, wherein the circular saw is a hand-held circular saw.

14. An apparatus for lifting a retractable lower safety-guard on a circular saw, comprising:

an actuator attached to the circular saw;

an elongated arm coupled to the actuator such that operating the actuator causes the elongated arm to lift, with additional operation of the actuator causing further lifting of the elongated arm; and an engagement element attached to the retractable lower safety-guard of the circular saw;

wherein, when lifted, the elongated arm engages the engagement element, thereby retracting the retractable lower safety-guard of the circular saw, wherein the elongated arm is rigid along its entire length, and wherein the elongated arm contacts the engagement element only after the actuator has caused the elongated arm to lift a sufficient distance.

15. An apparatus according to claim 14, wherein the engagement element is attached to an outer edge of the retractable lower safety-guard, close to an edge of a blade of the circular saw.

16. An apparatus according to claim 14, wherein depressing the actuator causes the elongated arm to lift, thereby retracting the retractable lower safety-guard of the circular saw.

17. An apparatus according to claim 14, wherein the circular saw is a hand-held circular saw.

* * * * *